(12) United States Patent
Hussain et al.

(10) Patent No.: US 10,733,238 B2
(45) Date of Patent: Aug. 4, 2020

(54) SCRIPT MANAGER FOR DISTRIBUTED SYSTEMS

(71) Applicant: Amazon Technologies, Inc., Reno, NV (US)

(72) Inventors: Amjad Hussain, Bellevue, WA (US); Sivaprasad Venkata Padisetty, Bellevue, WA (US); Xiong Wang, Redmond, WA (US); Boyuan Feng, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 15/148,869

(22) Filed: May 6, 2016

(65) Prior Publication Data

US 2017/0322929 A1 Nov. 9, 2017

(51) Int. Cl.
*G06F 16/93* (2019.01)
*G06F 16/176* (2019.01)
*G06F 9/46* (2006.01)
*G06F 9/455* (2018.01)
*G06F 21/82* (2013.01)
*G06F 21/62* (2013.01)

(52) U.S. Cl.
CPC .......... *G06F 16/93* (2019.01); *G06F 9/45558* (2013.01); *G06F 9/468* (2013.01); *G06F 16/176* (2019.01); *G06F 21/6218* (2013.01); *G06F 2009/45595* (2013.01)

(58) Field of Classification Search
CPC ......... G06F 17/30011; G06F 17/30165; G06F 9/45558; G06F 9/468; G06F 21/6218; G06F 2009/45559
See application file for complete search history.

(56) References Cited

U.S. PATENT DOCUMENTS 4,617,663 A * 10/1986 Lake .................... G06F 11/3684
714/32
6,076,030 A * 6/2000 Rowe ...................... E02F 3/435
172/4.5

(Continued)

FOREIGN PATENT DOCUMENTS

WO 2017/193074 11/2017

OTHER PUBLICATIONS

Non-Final Office Action dated May 10, 2018 in related U.S. Appl. No. 15/192,855.

(Continued)

*Primary Examiner* — Linglan E Edwards

(74) *Attorney, Agent, or Firm* — Hogan Lovells US LLP

(57) ABSTRACT

A customer of a shared resource environment can generate script to be executed by one or more virtual machines, or other such instances or resources, and share that script with other users. The script can relate to administrative or other such tasks, and can be encapsulated into a document, or other such expression, and stored to a network-accessible location. The owner of the document can designate permissions as to which users have rights to access and/or execute the script against their own virtual machines. An owner can grant permission to all users, no other users, or specific users. The script can include parameter values that can be set by the other users or links to specific executables or other objects, among other such options.

17 Claims, 8 Drawing Sheets

(56) References Cited

U.S. PATENT DOCUMENTS

| | | | |
|---|---|---|---|
| 6,182,286 B1* | 1/2001 | Sigal | G06F 8/71 |
| | | | 717/122 |
| 6,785,882 B1* | 8/2004 | Goiffon | G06F 8/36 |
| | | | 707/999.2 |
| 7,721,274 B1* | 5/2010 | Panchenko | G06F 9/44521 |
| | | | 717/111 |
| 8,019,780 B1 | 9/2011 | Pinkerton et al. | |
| 8,332,878 B2* | 12/2012 | Harm | G06F 21/6218 |
| | | | 719/318 |
| 8,510,043 B1* | 8/2013 | Whiton | G01C 21/367 |
| | | | 701/454 |
| 9,083,749 B1 | 7/2015 | Roth et al. | |
| 9,213,587 B2* | 12/2015 | Powlette | G06F 9/468 |
| 9,785,489 B1* | 10/2017 | Chheda | G06F 9/547 |
| 10,503,531 B2* | 12/2019 | Dake | G06F 9/45558 |
| 2003/0028809 A1* | 2/2003 | Goodman | G06F 17/211 |
| | | | 726/4 |
| 2004/0205136 A1 | 10/2004 | Whittenberger | |
| 2007/0156670 A1* | 7/2007 | Lim | G06F 21/6218 |
| 2008/0005024 A1* | 1/2008 | Kirkwood | G06Q 10/00 |
| | | | 705/50 |
| 2008/0049644 A1 | 2/2008 | Halbert et al. | |
| 2010/0293269 A1 | 11/2010 | Wilson et al. | |
| 2012/0131645 A1* | 5/2012 | Harm | G06F 21/6218 |
| | | | 726/4 |
| 2013/0152047 A1* | 6/2013 | Moorthi | G06F 11/368 |
| | | | 717/124 |
| 2013/0227137 A1* | 8/2013 | Damola | G06F 9/5072 |
| | | | 709/224 |
| 2013/0238780 A1 | 9/2013 | Devarakonda | |
| 2014/0059534 A1* | 2/2014 | Daum | G06F 8/65 |
| | | | 717/172 |
| 2015/0067665 A1* | 3/2015 | Thomas | G06F 8/65 |
| | | | 717/168 |
| 2015/0281180 A1* | 10/2015 | Raman | H04L 63/0272 |
| | | | 726/15 |
| 2016/0381032 A1* | 12/2016 | Hashmi | H04L 67/10 |
| | | | 726/4 |
| 2017/0116013 A1* | 4/2017 | Chen | G06F 9/45558 |

OTHER PUBLICATIONS

International Search Report and Written Opinion dated Oct. 13, 2017 in related PCT application No. PCT/US2017/031405.
Invitation to Pay Additional Fees and Partial Search Report dated Aug. 10, 2017 in related PCT application No. PCT/US2017/031405.
Final Office Action issued in corresponding U.S. Appl. No. 15/192,855 dated Oct. 4, 2018.
Advisory Action issued in corresponding U.S. Application No. 15/192,855 dated Dec. 12, 2018.
Notice of Allowance issued in co-related U.S. Appl. No. 15/192,855 dated Feb. 5, 2019.
International Preliminary Report on Patentability Chapter I issued in co-related International Application No. PCT/US2017/031406 dated Nov. 6, 2018.

* cited by examiner

SCRIPT MANAGER FOR DISTRIBUTED SYSTEMS

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Due to the shared nature of these resources, many security mechanisms are put in place in order to prevent unauthorized access into the data or virtual machines of other users. These mechanisms, along with other shared resource functionality, can prevent the sharing of information or content between users, which can cause many users to have to develop their own content or attempt to locate that content from other sources.

BRIEF DESCRIPTION OF THE DRAWINGS

Various embodiments in accordance with the present disclosure will be described with reference to the drawings, in which.

DETAILED DESCRIPTION

Figure 1:
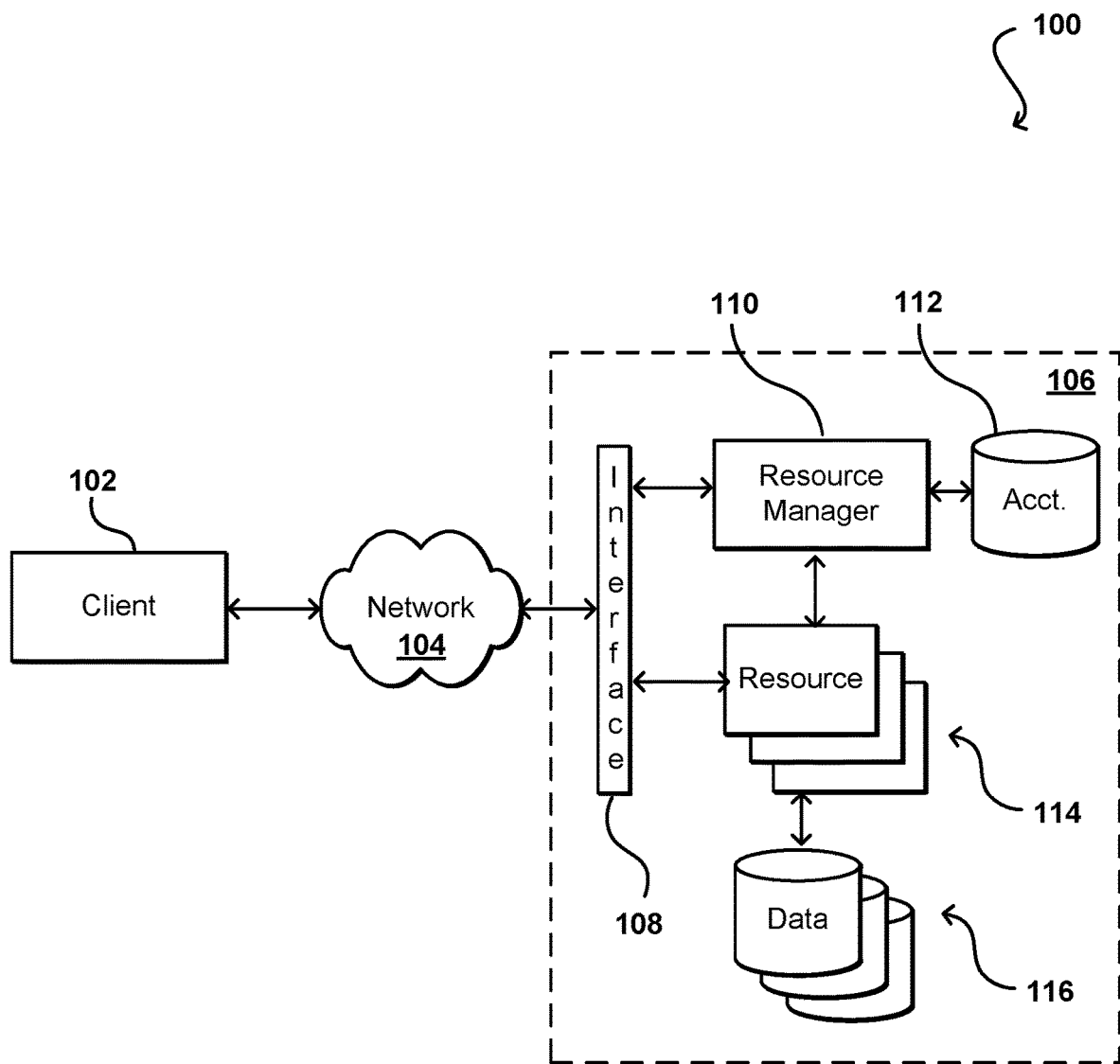
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment, such as a resource provider environment (also known as service provider environment). Resources can include, for example, compute instances, virtual machines, or other computing resources. In particular, various approaches provide mechanisms by which a customer of a resource provider can develop scripts to be executed by one or more virtual machines, or other such instances or resources, and share that script with other customers. In at least some embodiments, the script can relate to tasks, such as administrative tasks, to be performed on a computing resource, such as a virtual machine or compute instance. For example, the scripts may include a list of commands, code, or workflows that are to be executed by those computing resources, including a large number of computer resources (e.g., hundreds) comprising a fleet. The scripts may execute on the computing resources to perform a variety of tasks, such as to collect logs, stop a process, setup a web server, reset a machine, patch a machine, collect various server metrics (i.e., CPU or memory used for a task), or collect inventory information, etc. The scripts can be encapsulated into a document, such as a JSON document, XML document, or other such expression, stored to a network-accessible location. The author or owner of the document can designate permissions for other customers to have rights to access and/or execute the document (including the script contained therein) against the other customers' own virtual machines. An owner can make a document public or grant permissions to specific customers (or a group of customers), among other such options. The resource provider may also provide predefined documents for commonly performed tasks. The document can include parameter values that are set by the resource provider or document owner/creator. For example, there may be values that are necessary for the script to run properly. In addition, the script can include parameters that can be set by the other customers.

Furthermore, a document may contain links to specific executables, other scripts, or other objects that are located in other repositories, for example that users/customers other than the document owner/creator do not have access to modify or view. For instance, a script in a given document may contain a link to an executable located on computing resource and, when the script is executed, the executable will be run. In this example, the script in the document may be viewable by users/customers other than the document owner/creator, but the executable on the computer resource may not. This allows the document creator/owner to keep parts of resource management solution proprietary or hidden from other users/customers, while still providing that solution to them. This may also allow the document creator/owner to modify the executable without modifying the document or script.

As an example, an IT administrator, Admin 1, has created a script to do a 1-click setup to configure a server for a high-availability web site deployment. Another IT administrator, Admin 2, wants to do a similar configuration on their deployment as well. Using the service described herein, Admin 1 can share his document containing the script with Admin 2, who can then use the document/script to configure their web servers.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an certificate authority, a key management service, a corporate entity, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the certificate authority could be a service offered from within the resource provider environment, among other such options.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a customer of such a multi-tenant environment might have a variety of virtual machines or other such instances of different types and configurations allocated across the environment. In order to enable various tasks, such as low level administrative tasks, to be performed on these virtual machines, a customer will often have to create or obtain one or more scripts to be executed on the respective virtual machines. The customer can encapsulate these scripts in one or more documents that are stored in a network-accessible location and can be shared amongst the various resources. The scripts can include variable parameters, links to other scripts or executables, and other such elements. There is currently no straightforward way, however, for these documents to be accessed and executed by other customers on their resources, instances, or virtual machines. There is currently also no such way to share the scripts among all customers to a service or set of resources, among other such options.

Figure 2:
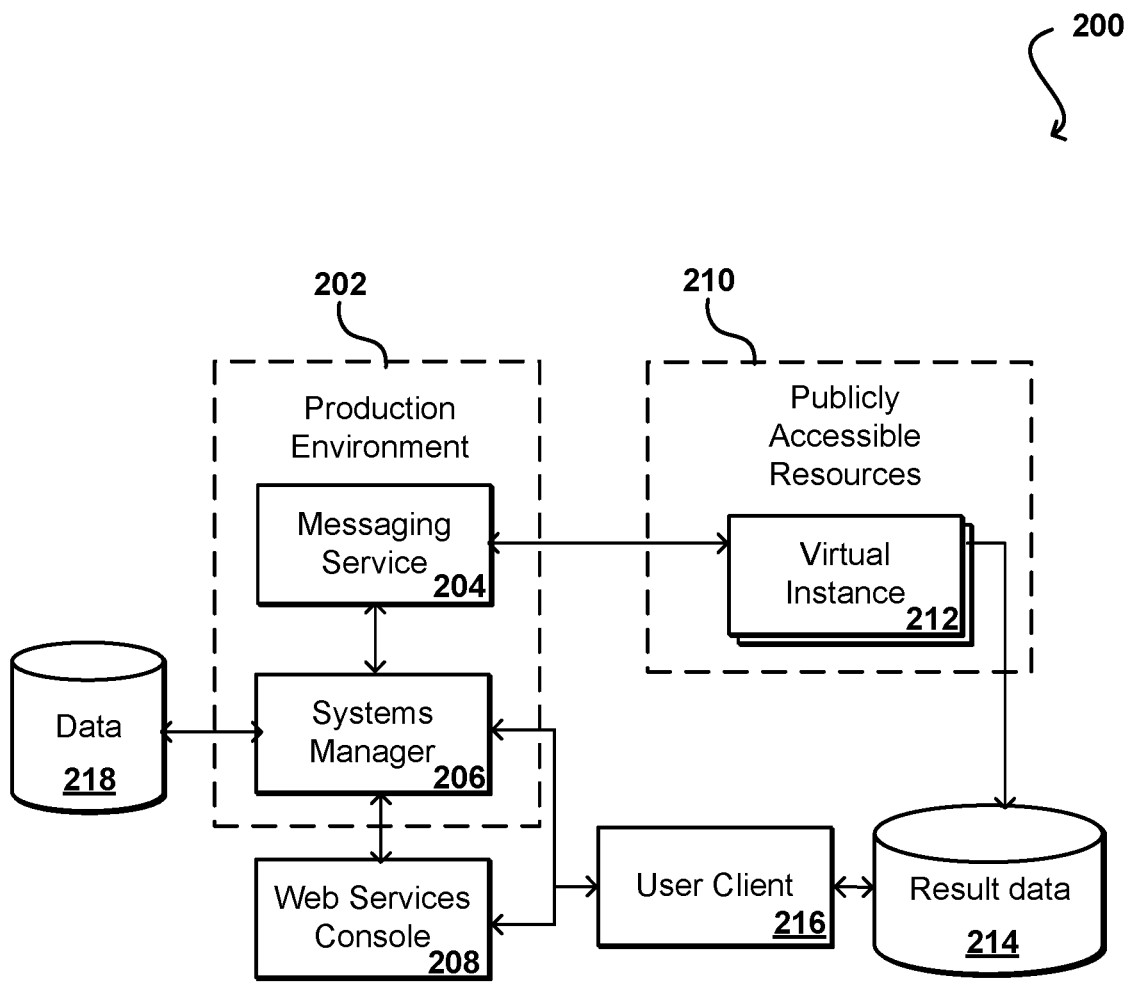
FIG. 2 illustrates an example subsystem for managing documents data that can be utilized in accordance with various embodiments.

FIG. 2 illustrates an example framework implementation 200 that can be utilized in accordance with various embodiments. In this example, the framework (here shown as part of a production environment 202) includes a messaging service 204 and a systems manager 206 for managing run time commands and other executables. The framework also includes one or more web service consoles 208, which can be internal or external to the production environment 202. It should be understood that additional or alternative components and elements can be used with such frameworks as well in accordance with the various embodiments. In this example, the console can communicate with the framework using a public endpoint (i.e., a virtual IP), and the framework can communicate with a set of customer virtual instances 212 located in a publicly-accessible resource environment 210. An instance can include an agent, which is the software component which runs the command and sends back the results. The systems manager 206 communicates with the internal messaging service 204, which can route messages between an instance and the back end infrastructure in order to send the payload to the appropriate instance. Various instances can obtain the appropriate information, which then can be output to an result data store 214 or other such repository. The repository can be located in the same or a different type of system or service than is used for the resource instances. Long payloads may be directly uploaded to the result data store. A messaging service can be used in some embodiments to pass messages between the various components. A user client 216 can then query the inventory data store 214 to obtain the requested data in the appropriate format. The systems manager 206 can be responsible for inventory management, and in some embodiments can receive the information from the various instances. The systems manager 206 can be responsible for managing the various documents, and making those available to the user client 216 (if permitted) through the appropriate console 208.

In one example, a first customer can use a user client 216 to access the console 208 for purposes of providing scripts or a document to be executed by one or more specified virtual instances 212. The systems manager 206 can obtain the document and store the document to a network-accessible location, such as a command data store 218. The customer can use the console 208 to specify the permissions on the document, which can be managed by the systems manager 206 or another such system or service. When a document is to be executed on an instance 212 for the customer, the messaging service 204 can send the instruction (and document if not separately provided) to the specified instance 212 for execution. The instance 212 can obtain role and/or permission data in order to ensure that the request is authorized for execution on the instance, etc. Any results of the execution can be written to an appropriate result data store 214 from which the client 216 can access the results.

A separate user wanting to execute the script against a different virtual instance 212 can access the web services console 208 to view scripts or documents to which that user has permission, although in other embodiments a user might be able to view other scripts or documents as well. In this example, the user can select an appropriate document (directly or through selection of an appropriate script), which can be obtained from the command data store 218 by the systems manager 206 and provided to the appropriate instance 212 for execution, with the results being placed in the result data store 214 or another appropriate location. In some embodiments the user might have been granted permission specifically by the owner of the script, here the original customer, or another such entity, or the document could have been made publicly available, at least to members of a group or subscribers to a service, etc. In at least some embodiments a customer or other authorized source can provide documents for "sale" through an electronic marketplace, for example, wherein another customer can select and purchase one or more documents for execution on that customer's behalf. The marketplace can involve purchases, sharing, and other such options.

In one example, all scripts and variables are self-contained in the document itself. The customer can create a document that contains the script(s) needed to perform one or more tasks, such as to collect logs, stop a process, restart a server process, setup a web server, reset a machine, patch a machine, collect various server metrics (i.e., CPU or memory used for a task), or collect inventory information, etc. The customer can set the permission and make the document accessible to specific users or all users, among other such options. When a consumer of the document goes to the console, the consumer can view any or all documents to which that consumer has permission. In at least some embodiments, that consumer will be able to view its contents and cause that script to be executed on one or more virtual machines or other such instances. The consumer can specify to run the script in that document on a specified set of instances, for example, and reference the public document that someone else created and granted permission(s). Internally, the service can check to ensure that the consumer has permission on that document, and if so the consumer can execute the script in the document. If the consumer does not have permission, the consumer may be prevented from accessing the script in the document, or may be prevented from viewing a list of users granted access to the document, for example. In some embodiments a consumer might be able to see a list of documents and request permission to access any or all of these documents.

Such a system has an advantage that a customer who predefines actions to be performed in a remote environment, such as by a virtual machine of a shared resource environment, can share these actions with other users so that the various users do not have to generate the script for these actions from scratch, and can take advantage of functioning scripts that have been tested and provided by others. In some embodiments, various sources of documents can be "trusted" sources from which documents can be obtained, whereby the consumer can generally trust that the document contains script that has been tested and performs as indicated. Script obtained from other sources may not function properly, or may contain bugs, etc., such that a consumer might want to first analyze or view the script before executing. A customer might instead obtain access to a document, view the script, then copy into a new document and test or analyze on their own before executing.

There also can be concern that even for trusted sources the documents might change or not be as purported. For example, a source might update a document or a new document might be issued with the same name in some embodiments. In order to ensure that a consumer using this document is not impacted by such an unexpected change, in at least some embodiments a checksum or hash (or other such representation) can be generated that can be used to verify that the content of the document is as expected. For example, a consumer first selecting and/or verifying a document might obtain a checksum automatically or in response to a request for such information. The content could include one or more scripts to perform specific tasks, such as to collect logs, stop a process, setup a web server, reset a machine, patch a machine, collect various server metrics (i.e., CPU or memory used for a task), or collect inventory information, etc. When the consumer subsequently attempts to use that document, a current checksum or hash for that document can be compared against the previously stored or expected value, and if the checksums or hashes do not match then the request can be denied (or another remedial action can be taken, such as to prompt the consumer before executing, etc.). If the checksums or hashes match, the result of the processing can be returned as to whether the process succeeded or failed, and if failed then why the process failed, etc.

The ability to share documents across consumers also reduces the management required by those consumers. For example, if a first customer develops a successful way to collect logs against a large number of instances that produces desirable results, then this functionality can be consumed by others without them having to separately generate and update the script. If a new document is generated that contains updates or fixes, that new document can be shared such that all users can leverage the improved or updated script. Users coming up with better ways of performing tasks can also share these documents with the community of users, such that these users can discover the script and improve their performance as well. The ability to log into a console and view the available scripts and documents from a single location similarly reduces the management time and consumption of resources, and eases the discoverability of these documents by potential consumers. A consumer can view the documents that are publicly available or to which the consumer has been granted permission, and can then run the documents against the appropriate instances.

The author of a script in a given document can also choose to have certain parameters left up to the caller to define. The author developing an efficient approach to collecting logs may not specify the precise location(s). A consumer of this public command can take the command and indicate the specific locations from which to collect log data. The author thus can have the control to provide an extensible set of parameters, and the consumer of the document can define those parameters when running the command.

As mentioned, the author can also determine who has permission to view and/or execute the script. An author might choose to not make the script available. The author might alternatively choose to make the script available to any authorized user, such as a user in a community or having a type of account, etc. The author can also choose specific users or groups to which to grant access. A console can provide a list of options from which the author can select. In some embodiments other authorized consumers or entities might be able to grant permission on a script as well, such as where there are delegated authorizations, etc. An author in some embodiments can also require that a checksum be verified before the script is executed in order to prevent the unauthorized or unintended modification of the script. An author (or other entity) can also potentially set policies, authentication requirements, or other criteria on these documents or predefined actions from a central location that is not offered through conventional systems. As discussed, the tasks encapsulated can be administrative functions that can be performed inside a virtual machine or instance, such as to collect logs, stop a process, restart a server process, setup a web server, reset a machine, patch a machine, collect various server metrics (i.e., CPU or memory used for a task), or collect inventory information, etc. In addition, a script may contain links to specific executables, other scripts, or other objects that are located in other repositories, for example that users/customers other than the document owner/creator do not have access to modify or view. For instance, a script may contain a link to an executable located on computing resource and, when the script is executed, the executable will be run. In this example, the script in the document may be viewable by users/customers other than the document owner/creator, but the executable on the computer resource may not. This allows the document creator/owner to keep parts of resource management solution proprietary or hidden from other users/customers, while still providing that solution to them.

Figure 3:
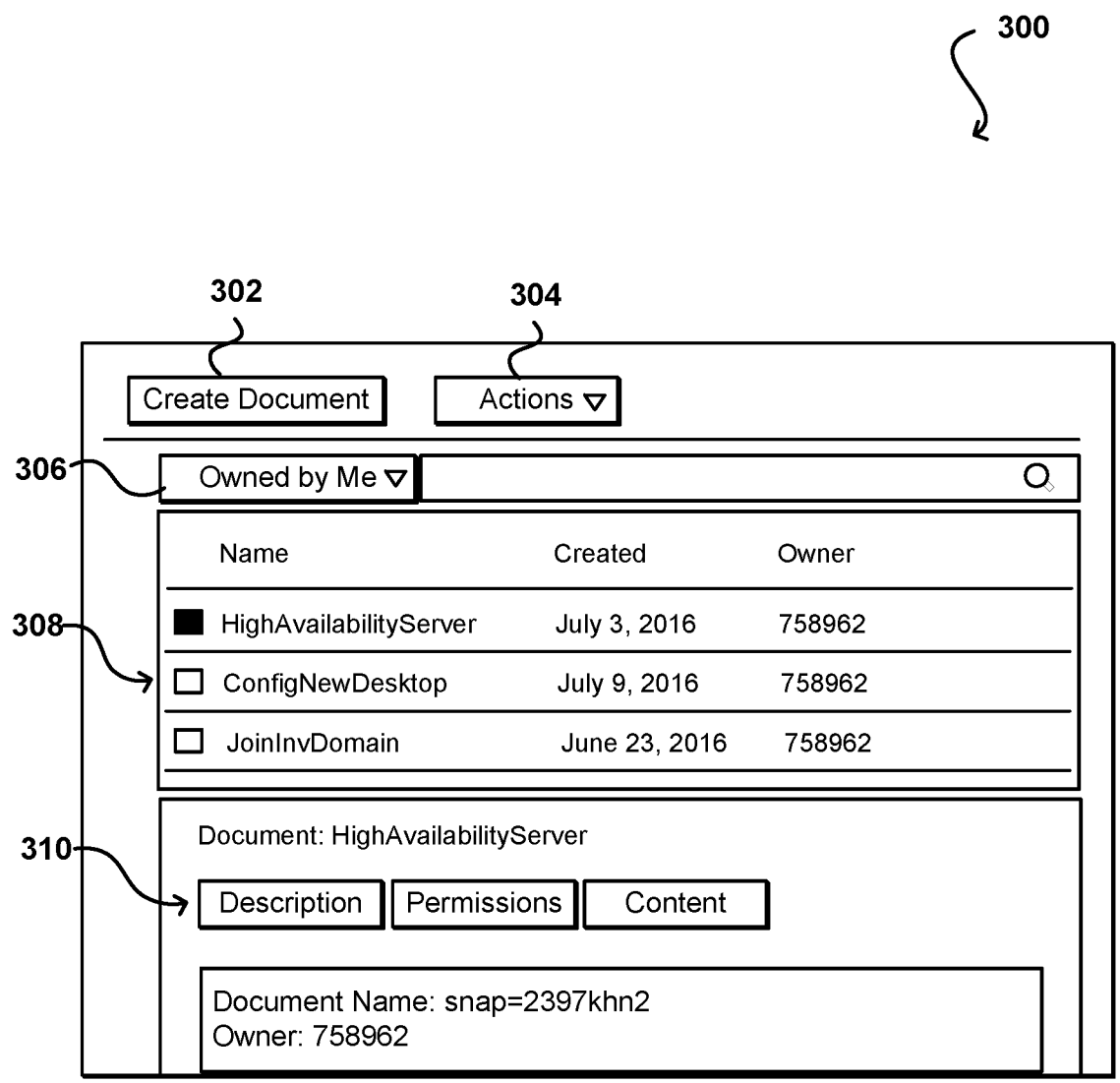
FIG. 3 illustrates an example user interface that can be utilized in accordance with various embodiments.

FIG. 3 illustrates an example console interface 300 that can be utilized in accordance with various embodiments. This example interface provides an option 302 for an author to create a new document, which can involve generating or pasting a script into an empty document, etc. Another option 304 enables a user or consumer to view different types of scripts or documents, as may relate to specific actions to be performed on specified instances. An option 306 can enable the customer to view documents that are owned by that customer, shared specifically with that customer, or publicly available, among other such options. In this example, the interface displays a list 308 of documents owned by the customer, including the name, date, and owner data, although other related data can be displayed as well. In this example, the customer has selected a specific document and information for that document is displayed through the console. The customer can select various tabs 310 or options to obtain different types of information for the document, such as a description, the applied permissions, the actual content or script, etc. If the document is a JSON representation, for example, the customer can view the code directly from the representation. For example, the console interface may display a document containing a script as follows:

```
{
    "schemaVersion": "1.2",
    "description": "Run a PowerShell script of specify the paths to scripts to run.",
    "parameters": {
        "commands": {
            "type": "StringList",
            "description": "(Required) Specify the commands to run or the paths to existing scripts on the instance.",
            "minItems": 1,
            "displayType": "textArea"
}
```

An author can potentially edit or update permissions, the script, and other such aspects, although in at least some embodiments any update to the content would result in a new document if that document is being consumed by another user. An author may also be prevented from deleting a document that is being shared or consumed by another user. For example, if customer A shares a document with customer B, customer A may be prevent from deleting the document. As an alternative, customer A may only be prevented from deleting the document if it is determined that content might refer to another script or executable that is located at a different network location, and the console can provide at least some information about that external content. An external script might be viewable through the console, but there may be no visibility into an executable or other such object. A customer wanting to protect some of the script can make the main document publicly available, for example, but can refer to a different document or executable to which a consumer cannot gain visibility, as discussed above. This allows the document creator/owner to keep parts of resource management solution proprietary or hidden from other users/customers, while still providing that solution to them. This may also allow the document creator/owner to modify the executable without modifying the document or script.

In some embodiments a consumer can obtain a copy that the consumer can update and store as a document owned by that consumer. Once the consumer has ownership of the document, the consumer can update as appropriate. A customer might only get permission to access a document for a determined period of time or number of uses, as may be specified by the author, current owner, administrator, or other such entity. For instance, a document owner/creator may grant permission for a particular customer to use a particular document 10 times. The service, for example in the resource provider environment, responsible for managing the documents, may record each time that document or script is executed. Afterwards, the customer may no longer be able to execute that document or script.

Figure 4:
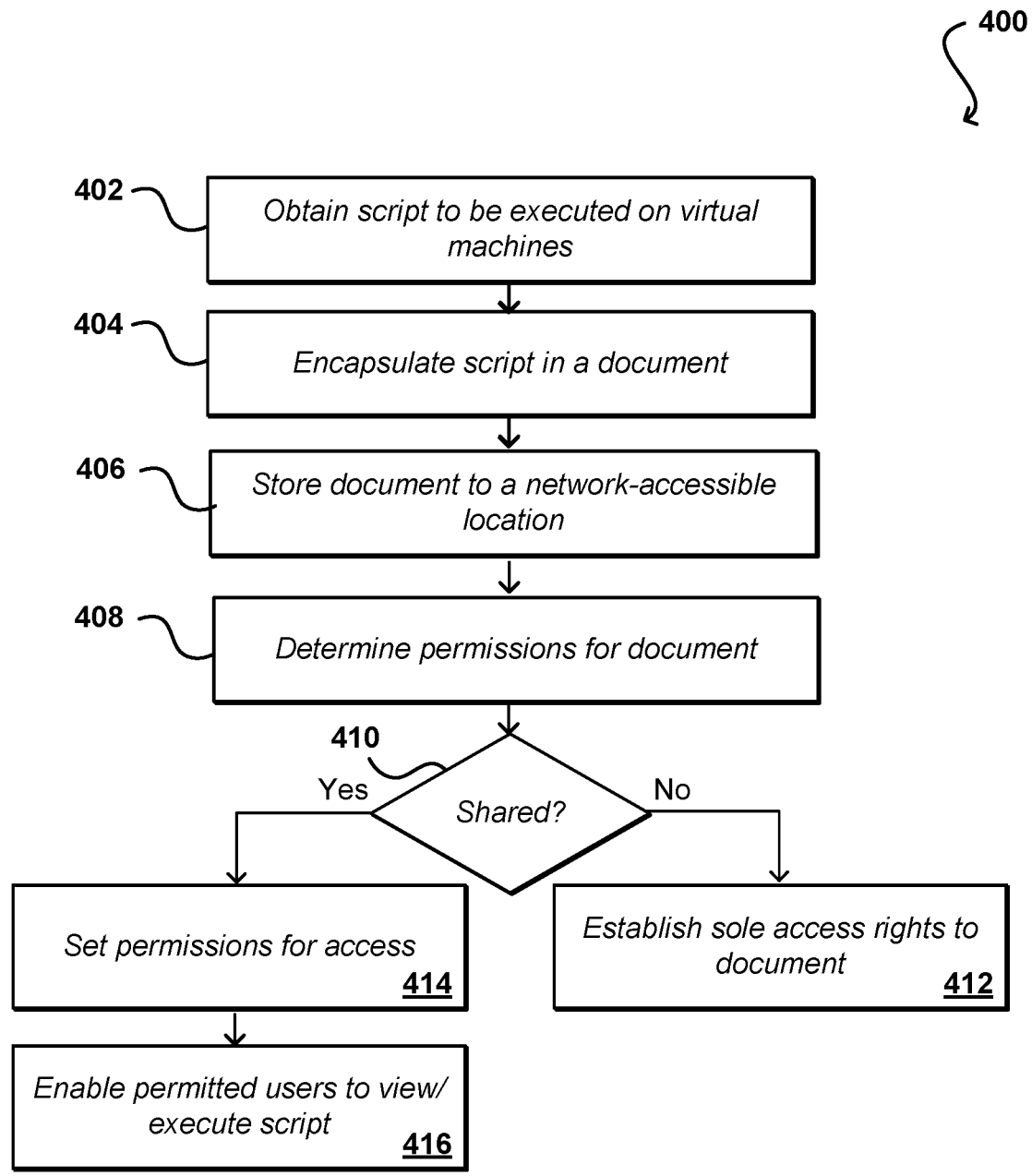
FIG. 4 illustrates an example process for sharing a document that can be utilized in accordance with various embodiments.

In at least some embodiments, similar functionality can instead be implemented through an API or other such interface. The following gives one example of how an API experience can be implemented in accordance with various embodiments. In this example:

```
# List shared documents
Get-DocumentList -DocumentFilterList @(New-Object SystemsManagement.Model.DocumentFilter("Owner", "Shared"))
# ************* Optional Parameter Owner for Document APIs ************* #
# As document name can be duplicate, for own documents use document
# name; for shared document, use document registered name
# ***************************************************************

# Get document in own account
Get-Document -Name highAvailbilitySetup
# Get document in 123456's account which is shared
Get- Document -Name rn:us: 123456:document/highAvailbilitySetup
# Get document description in own account
Get-DocumentDescription -Name highAvailbilitySetup
# Get document description in 123456's account which is shared
Get-DocumentDescription -Name rn:sm:us:document/highAvailbilitySetup
# ************************ Document Permission ************************ #
# Get document permission (only allow self-Owned document ops)
Get-DocumentAttribute -Name highAvailbilitySetup -Attribute GET
# Modify document permission (Add, only allow self-owned document ops)
Edit-DocumentAttribute -Name highAvailbilitySetup -Attribute GET -Add 123456
# Modify document permission (Remove, only allow self-owned document ops)
Edit-DocumentAttribute -Name highAvailbilitySetup -Attribute GET -Remove 123456
# ************* Send Command with Optional Parameter Owner ************* #
# Send document to instance (default self's document)
Send-Command -DocumentName highAvailbilitySetup
# Send document with shared document (owner is optional)
Send-SMCommand -DocumentName sm:ues-east-
1:5123456:document/highAvailbilitySetup -InstanceId @{"i-xxxxx
``` customer B is actually using the document. Other information can be displayed as well, such as a trusted state of the source, types of instances for the script, availability of a checksum, and other such information discussed and suggested herein. As mentioned, in some embodiments the FIG. 4 illustrates an example process 400 for sharing a document that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a script to be executed on one or more virtual machines is obtained 402, whether by creating, copying, or otherwise securing access. As mentioned, this can include script for an administrative task to be performed on a virtual machine, among other such options. The script can then be encapsulated 404 in a document, although other expressions can be used as well within the scope of the various embodiments. This can be, for example, a JSON document or other such expression. In some embodiments a schema validation or other such verification can be performed before the document is available for use. The document can be stored 406 to an appropriate network-accessible location. The location in at least some embodiments can depend at least in part upon whether or not other users will have access to the document.

Along with the document being stored, the author can also determine 408 or set one or more permissions for the document. As mentioned, this can include determining whether or not the document should be shared, as well as how the document should be shared. For example, the author can grant access permission to specific users or accounts, or can enable the document to be publicly accessible, among other such options. If the document is not to be shared 410, then the sole access rights to the document can be assigned to the author and the document can be stored in a place that might be only accessible to the author. A document not shared with other users can be updated or deleted in at least some embodiments. If, however, the document is to be shared with one or more other users, the permissions for access can be set 414 and made available to an appropriate management system or service. The permitted user(s) can then be enabled 416 to access, view, and/or execute the script within the document. As mentioned, if the script includes links or references to other scripts or executables, then the consumer might also be able to obtain at least some information for those objects. The script can also contain parameters whose values can be set by a consumer, among other such options. In at least some embodiments an author might be able to provide limits on the types of parameter values that can be used with the script, etc.

Figure 5:
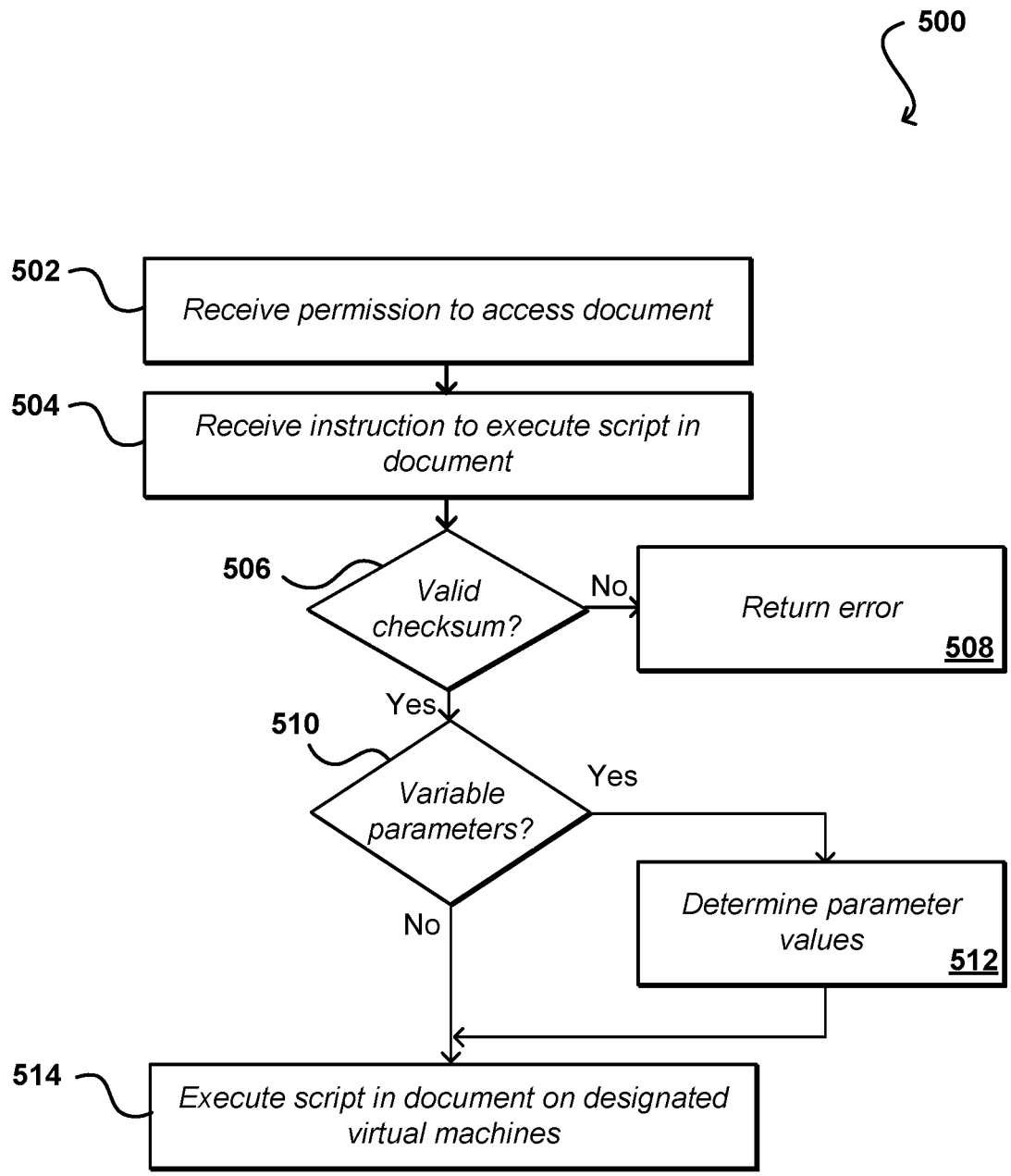
FIG. 5 illustrates an example process for consuming a document that can be utilized in accordance with various embodiments.

FIG. 5 illustrates another example process 500 that can be used to enable a consumer to access a document that can be utilized in accordance with various embodiments. In this example, a consumer receives 502 permission to access a document containing script capable of being executed by one or more virtual machines. As mentioned, this can be through global access or specific access granted to that consumer, among other such options. A system or device associated with the consumer can receive 504 an instruction to execute the script in the document against one or more virtual machines or other such instances or resources. In this example, a checksum can be used to determine whether the contents of the target document have changed since last use or verification. If it is determined 506 that the checksum is not valid, then an error can be returned and the script prevented from being executed on behalf of the consumer. If the checksum is valid then another determination can be made 510 as to whether any variable parameters or resource links are included in the script. If so, the parameter values for the script can be determined 512 and any resource links validated, among other such options. In at least some embodiments another verification can be made that the consumer has permission to access the content at the linked location. If the values cannot be determined or the resources unavailable, then the script execution can be denied. Once any parameter values have been obtained and links verified, the script can be executed 514 on the designated virtual machines.

Figure 6:
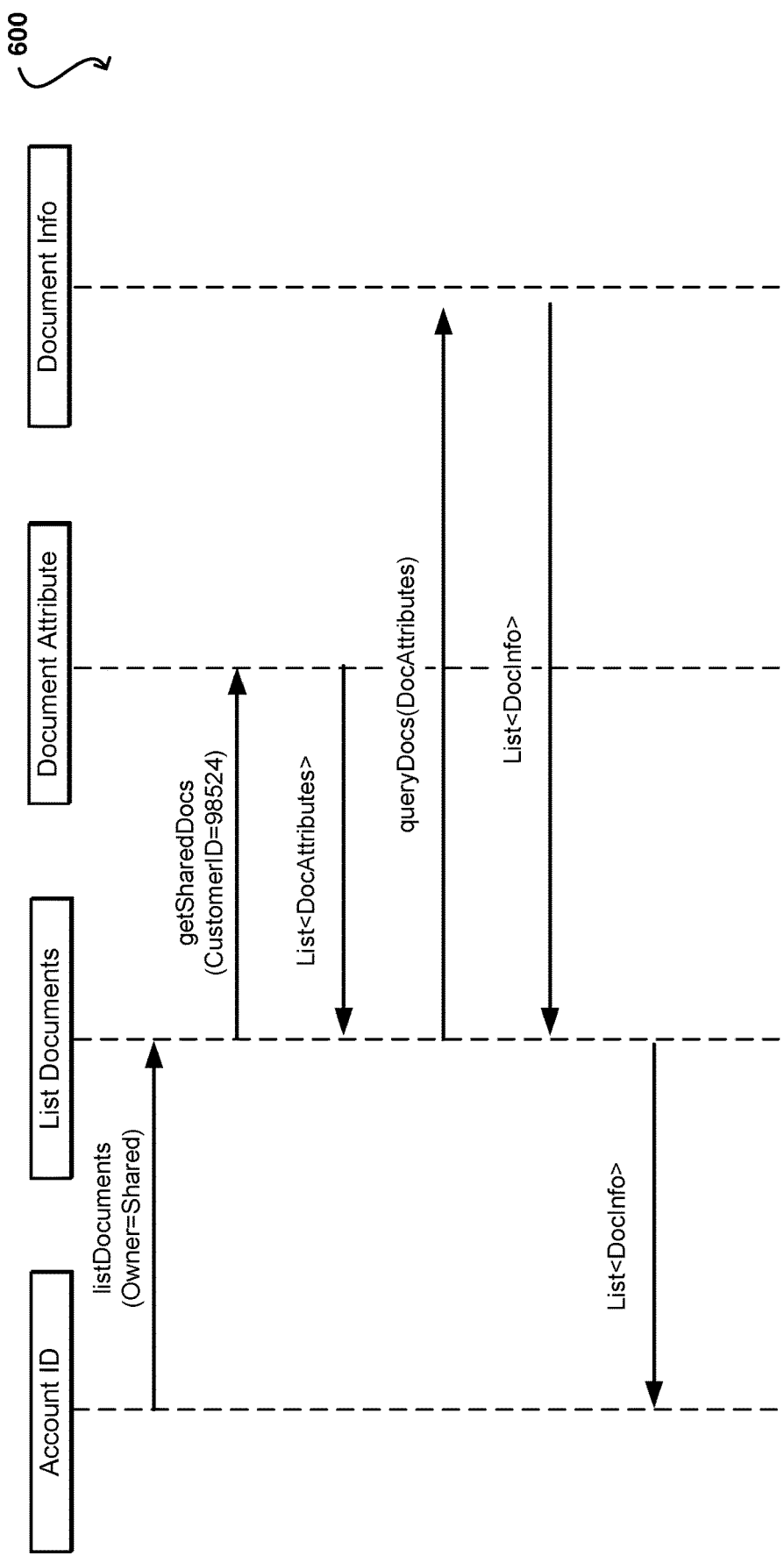
FIG. 6 illustrates an example call flow for listing shared documents that can be used in accordance with various embodiments.

FIG. 6 illustrates an example call flow 600 for determining a list of shared documents for a customer that can be utilized in accordance with various embodiments. In this example, a first call is issued to list the documents that are shared for a particular owner or customer ID. In order to determine the documents, a second call is made to get the document attributes based upon a particular parameter value, in this case the customer ID. A list of the document attributes is then returned. These document attributes can then be used in a call to get information for documents having those attributes or meeting those criteria. A list can be returned for those attributes, which can then be returned in response to the initial call.

Figure 7:
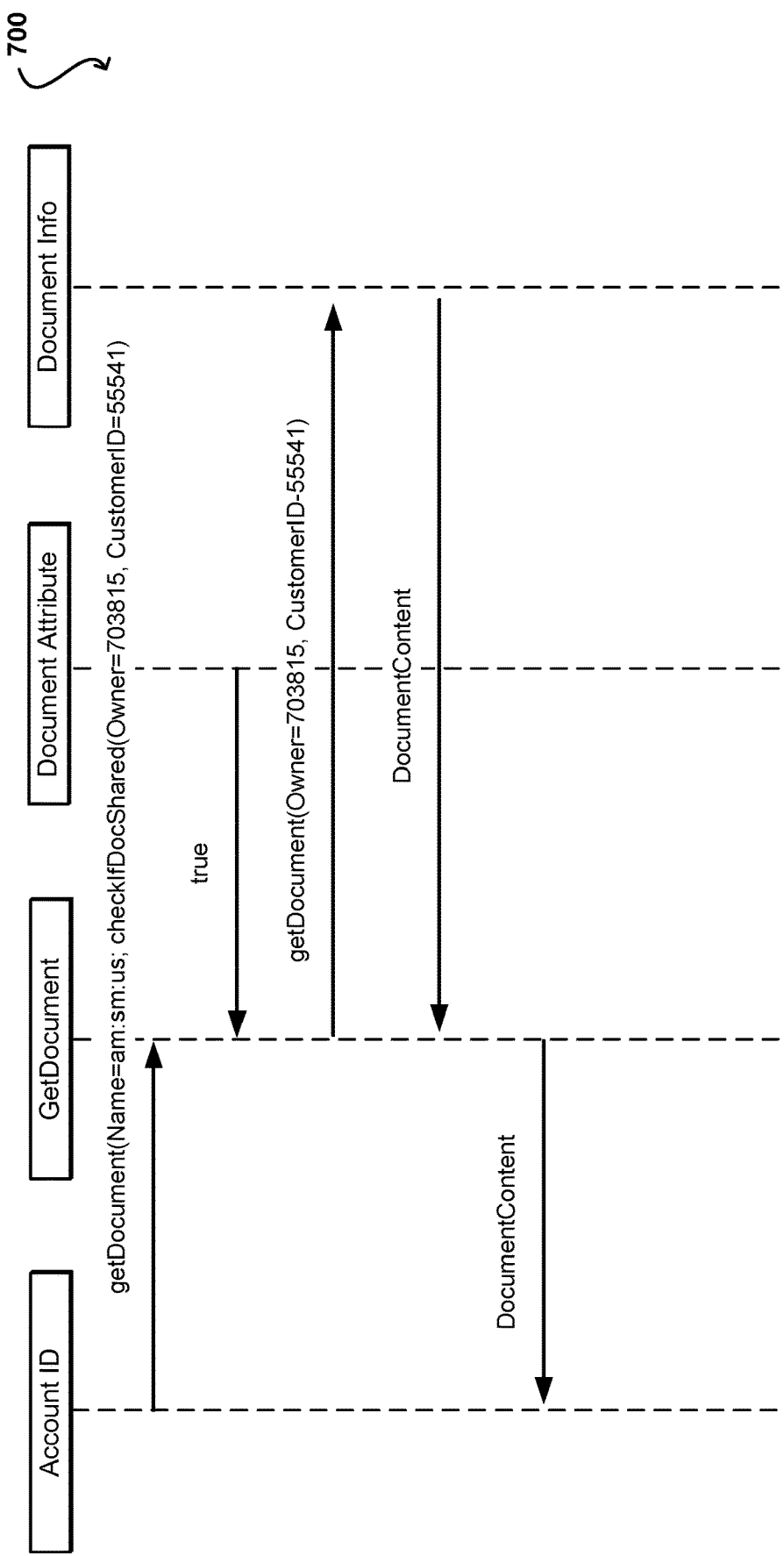
FIG. 7 illustrates an example call flow for getting shared documents that can be used in accordance with various embodiments.

FIG. 7 illustrates an example call flow 700 for getting document content that can be utilized in accordance with various embodiments. In this example a call to get a document can be made in response to a selection of one of the documents listed by, for example, the flow of FIG. 7. Here information identifying the document can be submitted with the call. A return call can indicate whether the document exists, is available, and has the appropriate permission for that customer. If true, a call to get the document can be transmitted to the appropriate resource, which can return the document information or content. That document information can then be transmitted back to the customer device or other requesting interface.

Figure 8:
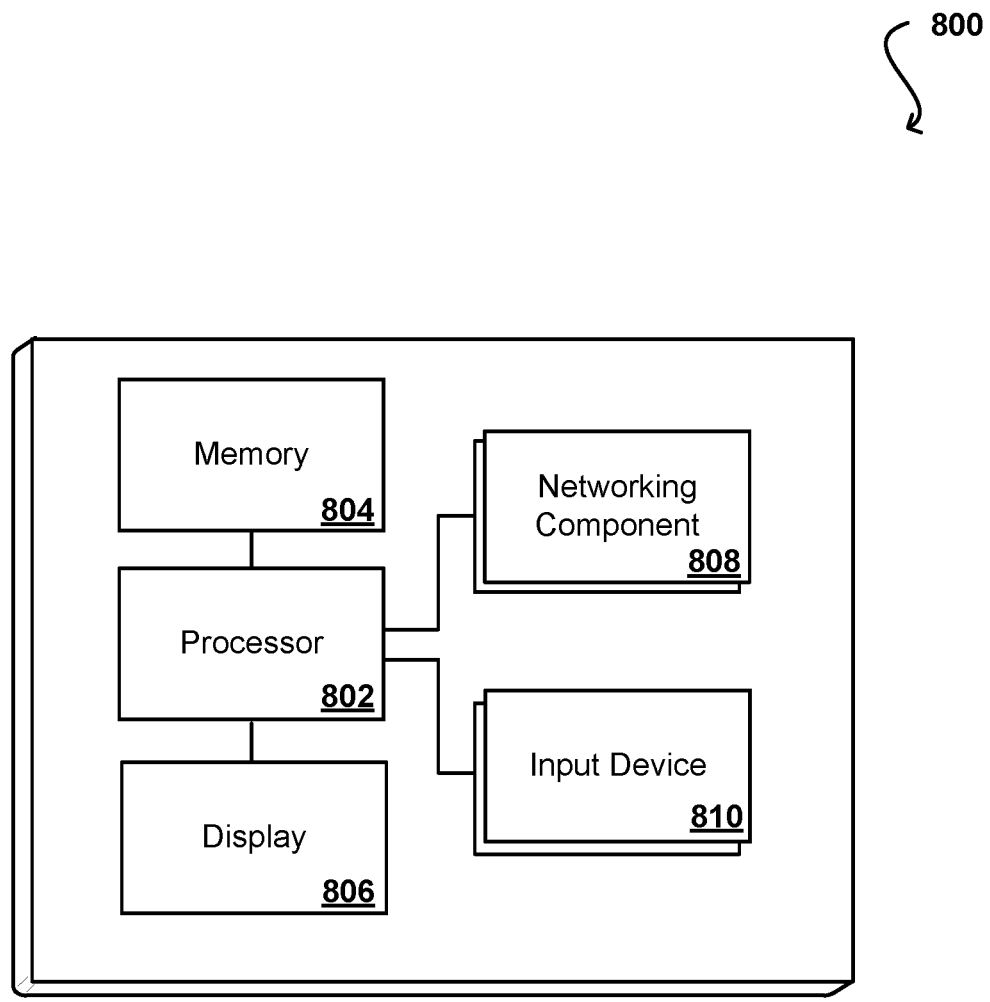
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a script from a first customer of a shared resource environment, wherein the script is configured to cause execution of at least one administrative task by a virtual machine operating on resources of the shared resource environment;
   receiving a set of permissions for the script, the permissions specified by the first customer, wherein the set of permissions enable the script to be accessed by other customers of the shared resource environment;
   making the script available in the shared resource environment according to the set of permissions;
   receiving a request from a second customer to execute the script on a virtual machine associated with the second customer;
   determining, based on the set of permissions, that the second customer has access to the script;
   determining one or more executable objects linked by the script and a variable parameter contained in the script;
   inserting a value, associated with the second customer, in the script for the variable parameter;
   enabling the first customer to modify the one or more executable objects without modifying the script and without notifying the second customer;
   enabling the value associated with the second customer to be modified by the first customer without modifying the script, and
   causing the script to be executed by the virtual machine associated with the second customer using the value associated with the second customer for the variable parameter, wherein execution of the script includes at least the second customer executing modified executable objects on the virtual machine associated with the second customer.

2. The computer-implemented method of claim 1, further comprising:
   causing the one or more executable objects to be executed by the virtual machine associated with the second customer, wherein the virtual machine associated with the second customer is unable to view code associated with the one or more executable objects.

3. The computer-implemented method of claim 1, further comprising:
   determining an initial checksum generated for the script stored to the location in the shared resource environment; and
   verifying that a current checksum for the script matches the initial checksum before allowing the script to be executed.

4. The computer-implemented method of claim 1, wherein the set of permissions include at least one of a permission for the script to only be accessible by the first customer, to be accessible by any customer, to be accessible by specific customers, or to be accessible for a specific number or period of use.

5. A computer-implemented method, comprising:
- receiving a script from a first user in a shared resource environment, wherein the script includes links to one or more executable objects and wherein the script includes one or more variable parameters;
- storing the script to a location in the shared resource environment from which a first resource associated with the first user can obtain and execute the script;
- setting one or more permissions on the script indicating at least a second user is permitted to access the script;
- allowing a second resource associated with the second user to obtain the script from the location and execute the script on the second resource;
- enabling the first user to modify the one or more executable objects without modifying the script and without notifying the second user;
- enabling one or more variable parameters to include values associated with the second user to be modified by the first user; and
- causing the script to be executed by a virtual machine associated with the second user using the modified values of the one or more variable parameters, wherein execution of the script includes at least execution of modified executable objects on the virtual machine associated with the second user.

6. The computer-implemented method of claim 5, further comprising:
- providing a first interface for the script to be provided on behalf of the first user, the first interface further enabling the one or more permissions to be specified for the script.

7. The computer-implemented method of claim 5, further comprising:
- providing a second interface for displaying information for a set of scripts, the set of scripts including scripts to which the second user has permission and selecting one or more of the set of scripts to be executed against the second resource.

8. The computer-implemented method of claim 5, wherein the script relates to at least one of collecting log data, stopping a process, setting up a server, resetting a machine, patching a machine, collecting server metrics, or collecting inventory information.

9. The computer-implemented method of claim 5, further comprising:
- determining the one or more executable objects linked by the script; and
- causing the one or more executable objects to be executed.

10. The computer-implemented method of claim 5, wherein the code associated with the one or more executable objects is inaccessible to the second resource.

11. The computer-implemented method of claim 5, further comprising:
- determining an initial checksum generated for the script; and
- verifying that a current checksum for the script matches the initial checksum before causing the script to be obtained and executed by the second resource.

12. The computer-implemented method of claim 5, wherein the one or more permissions include at least one of a permission for the script to only be accessible by the first user, to be accessible by any user, to be accessible by specific users, or to be accessible for a specific number of uses or period of use.

13. The computer-implemented method of claim 5, further comprising:
- enabling the second user to filter available scripts by those provided from at least one of a trusted source, a specific user, the second user, or one or more publicly available sources.

14. A system, comprising:
- at least one processor; and
- memory including instructions that, when executed by the at least one processor, cause the system to:
  - receive a script from a first user in a shared resource environment, wherein the script includes links to one or more executable objects and wherein the script includes one or more variable parameters;
  - store the script to a location in the shared resource environment from which a first computing instance associated with the first user can obtain and execute the script;
  - set a first permission on the script indicating at least a second user is permitted to access the script;
  - allow a second computing instance associated with the second user to obtain the script from the location and execute the script on the second computing instance; and
  - enable the first user to modify the one or more executable objects without modifying the script and without notifying the second user;
  - enable one or more variable parameters to include values associated with the second user to be modified by the first user; and
  - cause the script to be executed by a virtual machine associated with the second user using the modified values of the one or more variable parameters, wherein execution of the script includes at least execution of modified executable objects on the virtual machine associated with the second user.

15. The system of claim 14, wherein the instructions when executed further cause the system to:
- receive a second script associated with the first user;
- store the second script to the location; and
- set a second permission on the second script indicating that only the first user is permitted to access the second script.

16. The system of claim 14, wherein the script relates to at least one of collecting log data, stopping a process, setting up a server, resetting a machine, patching a machine, collecting server metrics, or collecting inventory information.

17. The system of claim 14, wherein the instructions when executed further cause the system to:
- determine the one or more executable objects linked by the script; and
- cause the one or more executable objects to be executed by the second computing instance, wherein the first user is enabled to specify the one or more executable objects, the code associated with the one or more executable objects being inaccessible to the second computing instance.

* * * * *